No. 121,547. Patented Dec. 5, 1871.

HADWEN L. PURDIE. LOCKING WASHER.

Witnesses
Wm H Seaman
John Purdie

Inventor
Hadwen L Purdie.
Daniel Breed
Atty.

UNITED STATES PATENT OFFICE.

HADWEN L. PURDIE, DECEASED, OF BUFFALO, NEW YORK, (JOHN PURDIE, ADMINISTRATOR.)

IMPROVEMENT IN NUT-LOCKING DEVICES.

Specification forming part of Letters Patent No. 121,547, dated December 5, 1871.

*To all whom it may concern:*

Be it known that I, HADWEN L. PURDIE, of Buffalo, in the county of Erie and State of New York, have invented a new and useful Improvement in Locking Washers; and I do hereby declare that the following is a full and exact description thereof, reference being had to the accompanying drawing and to the letters of reference marked thereon.

My invention consists of a hollow washer in combination with a pivoted dog and spring.

Figure 1:
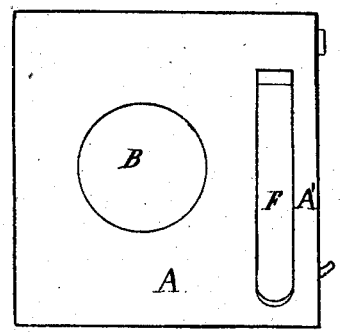
Figure 2:
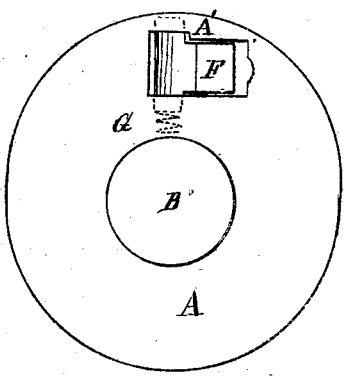
Figure 3:
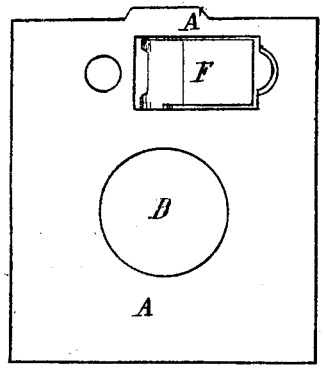
Figure 4:
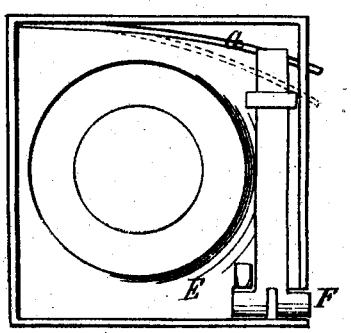
Figure 5:
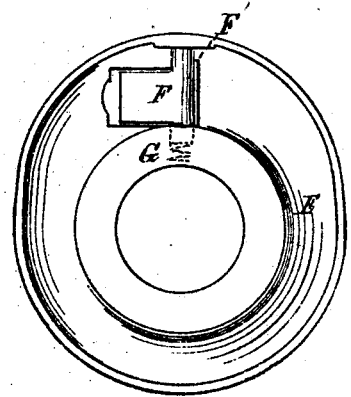
Figure 6:
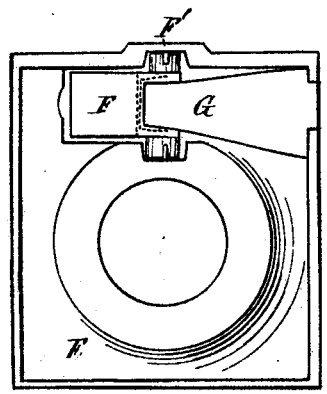
Figure 7:
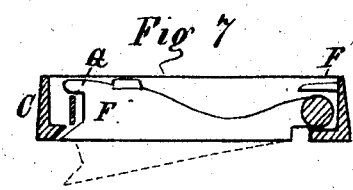
Figure 8:
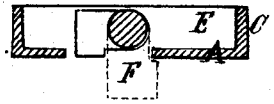
Figure 9:
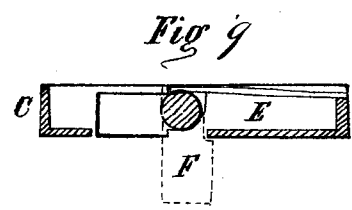

In the accompanying drawing, Figure 1 is a face view of one form of combination of hollow washer, pivoted dog, and spring. Fig. 2 is a face view of a modification of the same combination. Fig. 3 is a face view of another form of the same invention; Figs. 4, 5, and 6, a view of the reverse or recess side of the different forms seen in Figs. 1, 2, and 3; and Figs. 7, 8, and 9 are sections of the same.

Figure 10:
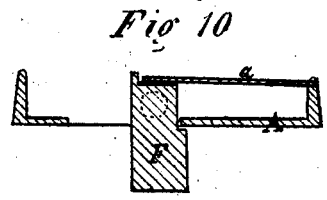

In the different figures, A represents the face-plate, in which there is the usual hole B for the bolt. This plate is surrounded by a projecting flange, C, and provided with a projecting hub, D, around the bolt-hole B, thus giving a hollow space, E, to receive the pivoted dog F, while the nut is being turned home or removed. Instead of making the washer hollow it may be cast with a recess for the dog; but this plan would require an unnecessary amount of metal. The dog F is pivoted at F' so as to swing freely when desired, and the spring G, in connection with catches yet to be explained, are intended to lock the dog in place, and thus lock the nut or bolt-head, as desired. The form of spring and dog, shown in Figs. 1, 4, and 7, run nearly the length or width of the washer. The dog is shown at rest and held in the recess of the washer by means of the spring, which is seen in the notch at the end of the dog in Fig. 7. The spring is set edgewise, so that it acts rather as a stop than a spring. But in dotted lines, Figs. 7, 8, and 9, the dog projects below the face of the washer so as to lock the nut. It will be observed that the dog, when pressed by the nut, will rest against the face-plate of the washer at A', Fig. 1, and thus the strain is taken from the dog. In like manner the dog, as seen in the other forms, or in Figs. 2 and 3, is relieved of strain by resting against the face-plate A at A'. In Fig. 2 a coiled spring, G, is inserted in the socket of the pivot, as seen in dotted lines, so as to push the dog laterally, when the dog enters a notch or catch, H, Fig. 2, and is thus prevented from returning to the recess of the hollow washer. In Fig. 6 is seen a plate-spring, G, which enters a notch, I, Fig. 10, and thus locks the dog in working position.

I do not limit my invention to the precise forms or arrangements above described, but propose to vary the arrangement of my new combination, as desired.

I do not in this case broadly claim a pivoted dog swinging entirely through the plate of the washer, as I have claimed that device in a separate application for a patent; but in this case I limit my claim to such improvement when combined with a spring.

Having described my invention, I claim—

The combination of the hollow washer with a spring and a pivoted dog swinging through the plate of the washer in an opening, as set forth.

HADWEN L. PURDIE.

Witnesses:
DANIEL BREED,
JOHN PURDIE.

(14)